United States Patent [19]
Bly et al.

[11] Patent Number: 6,124,593
[45] Date of Patent: Sep. 26, 2000

[54] FAR INFRARED THERMAL IMAGING SYSTEM

[75] Inventors: Vincent T. Bly, Fairfax County, Va.; Lester F. Gillespie, Montgomery County, Md.; Lynn E. Garn, Prince William County, Va.

[73] Assignee: The United States of America as represented by the Secretary of the Army, Washington, D.C.

[21] Appl. No.: 07/023,408

[22] Filed: Jan. 16, 1987

[51] Int. Cl.[7] ............................. H01L 25/00; G02F 1/03; G02B 26/00

[52] U.S. Cl. ......................... 250/332; 250/330; 359/260; 359/292; 359/294

[58] Field of Search ................................... 250/330, 332, 250/333, 352, 338 SE, 393, 338 PY, 472.1–474.1; 350/353, 354, 359–361, 363; 359/260, 292, 294, 288

[56] References Cited

U.S. PATENT DOCUMENTS

| | | | |
|---|---|---|---|
| 4,229,081 | 10/1980 | Jones et al. | 350/361 |
| 4,441,791 | 4/1984 | Hornbeck | 350/360 |
| 4,494,826 | 1/1985 | Smith | 350/360 |
| 4,536,061 | 8/1985 | Nishimura | 350/353 X |

*Primary Examiner*—Stephen C. Buczinski
*Attorney, Agent, or Firm*—Anthony T. Lane; Max L. Harwell; Aubery J. Dunn

[57] ABSTRACT

A far-infrared image is directed onto a transducer having a planar array of absorbing discs on one side. The discs are supported by a thin membrane which expands and bulges as the discs heat up. The discs thus change their spacing with respect to a partially reflective mirror. The nominal spacing between the discs and mirror is about 1/4 wavelength of the infrared radiation, such that absorption is enhanced. The mirror is supported on a transparent substrate through which visible or near-infrared light is shown, and carries a perforated mask atop an insulating layer and in registration with the discs. The mirror/discs thus establish a Fabry-Perot cavity for the visible or near-infrared light, whereby a visible or near-infrared image may be observed or detected as the various discs establish various spacings in accordance with incremental variations in the infrared image. An electrostatic field is established between the mirror and the shield by a voltage source. This field induces an electrostatic field in the discs to pre-bias the discs toward the mirror and thus to tune or adjust the sensitivity of the transducer.

2 Claims, 2 Drawing Sheets

FAR INFRARED THERMAL IMAGING SYSTEM

The invention described herein may be manufactured, used, and licensed by the U.S. Government for governmental purposes without the payment of any royalties thereon.

BACKGROUND OF THE INVENTION

This invention is in the field of systems for presenting visible or near-infrared images of far-infrared scenes, and is particularly concerned with an uncooled imaging transducer for converting a far-infrared image to a visible or near-infrared image. There are various systems known for providing visible or near-infrared images of far-infrared scenes; these systems include both thermal and quantum types of detectors, each with its own advantages. Unfortunately, all of these systems suffer from one or more significant disadvantages. Specifically, for a thermal detector, only a very small percentage of the incident radiation is actually used to advantage in producing a visible or near-infrared image; the majority of the radiation is essentially dumped into a heat sink because of poor thermal isolation between the detector elements and their support substrate. In the case of a quantum detector, cryogenic cooling is usually required for efficient operation in the far-infrared. Thermal detectors, besides having the problem of poor thermal isolation (which degrades sensitivity), also have large thermal masses (which lengthen time responses). The instant invention is uncooled and, because of its construction, has detector elements with greater thermal isolation (which gives geater sensitivity) than known thermal systems, and less thermal mass (which gives a faster time response) than such known thermal systems. The invention as described in U.S. patent application Ser. No. 901,081, filed Jul. 31, 1986 by one of the instant inventors (Bly), operates in real time and requires no special preparations, etc. The invention herein is an improved version of that invention.

SUMMARY OF THE INVENTION

This invention is an uncooled imaging system for infrared radiation. The system includes a transducer onto one side of which a far-infrared image is directed and which provides a visible or near-infrared image on an opposite side when illuminated by visible or near-infrared light. The transducer includes a planar array of infrared absorbing islands on a thin-film support. The film is supported by a perforated plate, with the perforations centered on the islands. There is, on the opposite side of the plate from the film, a perforated shield in registration with the islands, an insulating layer and a partially-reflective sheet. The spacing between the sheet and the islands is such that far-infrared absorption in the islands is enhanced. The sheet is supported by a relatively thick and (visible light or near-infrared) transparent substrate. The sides of the islands on the film and the partially-reflective sheet form a Fabry-Perot cavity for visible or near-infrared light directed through the substrate, whereby a visible image may be viewed, or a near-infrared image detected. A voltage source is connected between the shield and the partially-reflective sheet. This voltage induces an electrostatic field in the islands which forces them toward the substrate and allows the sensitivity of the transducer to be adjusted.

DESCRIPTION OF PREFERRED EMBODIMENT

Figure 1:
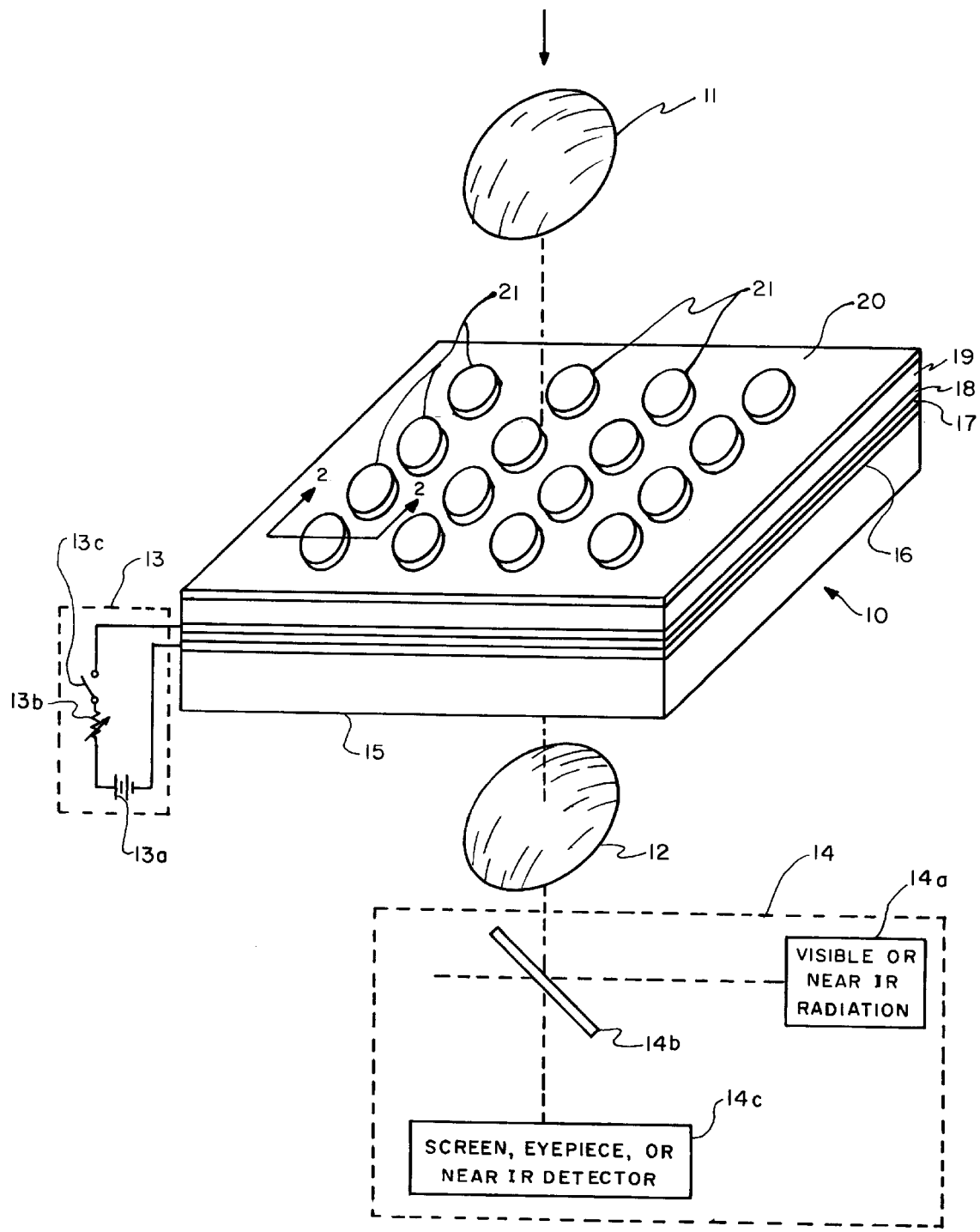
FIG. 1 is a schematic/pictorial showing of one embodiment of the invention.

The invention may be best understood when this description is taken in conjunction with the drawings. In FIG. 1, we see an infrared imaging system consisting of transducer 10, lenses 11 and 12, near-infrared electrical bias means 13, and viewing system 14. The transducer consists of substrate 15, transparent to visible or near-infrared light, partially reflective mirror 16, insulating (and transparent to visible or near-infrared light) layer 17, perforated metallic mask 18, perforated insulating spacer 19, thin insulating membrane 20, and far-infrared absorbing islands/discs 21 on membrane 20 in a regular array. Far-infrared radiation is directed by lens 11 as an image onto islands 21 and membrane 20. A visible or near-infrared image is extracted from the transducer by visible (or near-infrared) light directed through substrate 15 by lens 12. The image is obtained by viewing system 14 as explained for the operation of the Bly invention referred to above in the Background of the Invention. This system includes a source 14a of visible or near-infrared radiation, a partially reflective mirror (beam splitter) 14b, and screen, eyepiece or near-infrared detector 14c. Bias means 13 consists of battery 13a, potentiometer 13b, and switch 13c (or equivalent). This means is connected between mirror 16 and mask 18 to establish an electrostatic field between them, and to thus induce a field in the discs. The discs are therefor biased toward the substrate. The sensitivity of the transducer may thus be varied of adjustment of potentiometer 13b.

Figure 2:
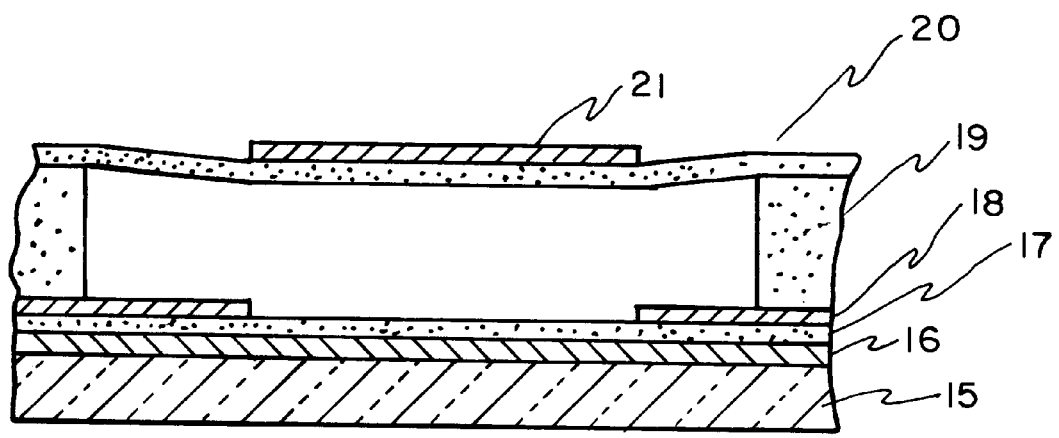
FIG. 2 is a partial sectional view (enlarged in some dimensions) taken in direction 2—2 in FIG. 1.

Looking now to FIG. 2, we can see some of the details of the invention not visible in FIG. 1. Substrate 15 is relatively thick compared to the other layers, and may be one-quarter inch thick glass. Mirror 16 is a thin metal/dielectric layer, at least partially reflective both to visible and infrared radiation. Layer 17 is relatively thin, on the order of 1000 Å thick and may be made of SiO or some other insulator. Mask (or blocking layer) 18 is perforated in a regular array corresponding to and in registration with the island array, and may be in the form of an opaque metal layer, or other forms. Spacer 19 is relatively thick compared to 16, 17, and 18 is 2.5–7.5 $\mu$m thick and may be made of an insulator such as ZnS. Membrane 20 is an ultrathin film (50–500 Å) of aluminum oxide, cellulose nitrate, or another polymer. It is chosen to have a high thermal coefficient of linear expansion and a low thermal conductivity. The discs 21 are formed to match ½ free-space impedance of approximately 188 ohms per square. Typical (but not limiting) dimensions in the transducer are as follows: disk diameter is 25 $\mu$m on 50 $\mu$m centers, spacer perforation diameters are 40 $\mu$m, and mask perforation diameters are 25 $\mu$m. It should be understood that the thickness of membrane 20 is greatly exaggerated in the drawings; if drawn to scale, it would be invisible.

OPERATION OF INVENTION

Incoming far-infrared radiation is directed as an image onto discs 21 on membrane 20. Discs 21 absorb this radiation and heat up. The heat is transferred to and causes the portions of the membrane around each disc to expand. This causes displacement of the discs (the membrane bulges) with respect to partially-reflective mirror 16. The nominal spacing between the discs and mirror is chosen to be about one-quarter wavelength of some medium incoming far-infrared wavelength (a medium incoming wavelength may be 10 $\mu$m). This spacing is determined by the thickness of

17, 18, 19 and 20 and enhances absorption of the infrared radiation. The transducer is read out (i.e. a visible image may be seen or a near-infrared image detected) by visible or near-infrared light, preferably monochromatic (such as laser radiation) directed through the substrate, through the mirror, and onto the opposite side of the discs from the infrared radiation. The disc is highly reflective to this radiation and a Fabry-Perot cavity is thus formed between each disc and the corresponding portion of the mirror. Slight variations in the spacings therebetween thus cause significant variations in the visible light reflected from the transducer. We estimate that the spacing will change on the order of 10 Å per millidegree Celsius change in temperature of the infrared radiation image. The different incremental temperatures of the infrared image thus induce corresponding spacings in the Fabry-Perot cavities and allow a visible or near-infrared image to be readily obtained.

We claim:

1. A far-infrared imaging system comprising:
   a transducer including:
   a substrate essentially transparent to visible and near-infrared light;
   a partially-reflective metallic mirror on said substrate;
   a transparent insulating layer on said mirror;
   a perforated metallic mask on said insulating layer;
   a perforated insulating spacer plate on said mask and in registration therewith;
   an ultrathin-film flexible insulating membrane on said spacer plate;
   an array of far-infrared-absorbing and visible or near-infrared radiation reflecting islands on said membrane, each island being in registration with a respective perforation of said plate;
   means for directing a far-infrared image onto said array, wherein said membrane is nominally spaced approximately one-quarter the wavelength of the far-infrared from said substrate, whereby a quarter-wave absorber for far-infrared is established between said islands and said mirror, and whereby said membrane expands as said far-infrared radiation is absorbed and said islands thus move with respect to said mirror;
   means for directing visible or near-infrared light through said substrate, mirror, mask, and spacer plate onto the opposite side of said islands of said array from the infrared image, whereby the space between said islands and said mirror acts as a Fabry-Perot cavity for said visible or near-infrared radiation, and whereby variatiors is the reflectance of said Fabry-Perot cavity to visible or near-infrared radiation occur as said membrane expands and said islands move with respect to said mirror, wherein said variation in reflectance over the array of islands define a visible or near-infrared image;
   and adjustable means for applying an electric field between said mirror and said mask, whereby said islands are electrostatically biasable toward said substrate in order to adjust the sensitivity of said transducer.

2. The system as set forth in claim 1 wherein said means for applying includes:
   a voltage source with two different polarity poles, and with one pole connected to said mirror and the other pole connected to said mask.

* * * * *